(12) United States Patent
Staser et al.

(10) Patent No.: US 6,205,714 B1
(45) Date of Patent: *Mar. 27, 2001

(54) MODULAR VEHICLE DOOR

(75) Inventors: Brian Hale Staser, Troy; Mark Manuel, Shelby Township, Macomb County; Rick Mahan, Oxford, all of MI (US)

(73) Assignee: Delphi Technologies, Inc., Troy, MI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/212,669

(22) Filed: Dec. 16, 1998

(51) Int. Cl.⁷ ....................................................... B60J 5/04
(52) U.S. Cl. ............................. 49/502; 49/503; 296/146.6
(58) Field of Search ............................. 49/502, 503, 348, 49/349, 350, 351; 296/146.5, 146.6

(56) References Cited

U.S. PATENT DOCUMENTS

| | | |
|---|---|---|
| 4,794,735 | 1/1989 | Batcheleder . |
| 4,831,710 * | 5/1989 | Katoh et al. ........................ 49/502 X |
| 5,095,659 * | 3/1992 | Benoit et al. .......................... 49/502 |
| 5,355,629 * | 10/1994 | Kimura et al. ......................... 49/502 |
| 5,379,553 * | 1/1995 | Kimura et al. ..................... 49/506 X |
| 5,417,470 | 5/1995 | Holt . |
| 5,535,553 | 7/1996 | Staser et al. . |
| 5,538,094 * | 7/1996 | Cobes et al. ................... 296/146.6 X |

FOREIGN PATENT DOCUMENTS

| | | |
|---|---|---|
| 0291107 | 11/1988 | (EP) . |
| 2321660 | 8/1998 | (GB) . |

* cited by examiner

*Primary Examiner*—Jerry Redman
(74) *Attorney, Agent, or Firm*—Patrick M. Griffin

(57) ABSTRACT

A modular vehicle door has a hollow door shell of sheet metal panels that are secured together at their abutting periphery, a crash beam that is attached to hollow door shell so as to extend across the length of the door, and a module that supports several parts of vehicle door that is preassembled and assembled to the hollow door shell as the preassembled module. The hollow door shell has a hinge reinforcement at a forward end and a latch reinforcement at an aft end. The module has a metal support beam that is attached to the hinge reinforcement at one end and to the latch reinforcement at the other end so that the metal support beam extends across the length of the door and forms a box section with the crash beam. The metal support beam has upper and lower channels and the module includes an insert molded carrier that has a plurality of ribs that cooperate with the channels of the metal support beam to increase the torsional ridgidity of the metal support beam. When attached to the door shell, the module improves the crashworthiness of the modular vehicle door.

10 Claims, 4 Drawing Sheets

MODULAR VEHICLE DOOR

TECHNICAL FIELD

This invention relates to vehicle doors and more particularly to modular vehicle doors in which several working parts of the vehicle door are assembled into a module that is then assembled to the sheet metal structure of the door.

BACKGROUND OF THE INVENTION

Vehicle doors generally comprise a hollow structural unit or shell that is made of an inner sheet metal door panel and an outer sheet metal panel that are mated together and secured to each other along a mating periphery. In the past, the vehicle door was then completed by adding several parts to this hollow structural shell more or less individually.

In recent years, most vehicle doors have included a crash beam that extends across the length of the vehicle door to absorb side impact loads and thus improve passenger safety and crashworthiness of the vehicle.

Another recent trend in vehicle doors is modular construction where several door parts are preassembled into a module that is then assembled to the hollow structural shell as a preassembled module rather then a number of individual parts; the purpose of the modular construction being to facilitate assembly and reduce assembly cost. See for instance, U.S. Pat. No. 5,535,553 granted Jul. 16, 1996 to Brian H. Staser, Danny W. Figlioli and Daniel H. Forrest for a superplug vehicle door module.

SUMMARY OF THE INVENTION

An object of the invention is to provide a vehicle door of modular construction in which the preassembled module not only facilitates assembly and reduces assembly cost but also enhances crashworthiness of the modular vehicle door.

A feature of the invention is that the modular vehicle door of the invention has a preassembled module that includes a support beam that not only supports several components but also combines with the crash beam to improve crashworthiness.

Another feature of the invention is that that modular vehicle door of the invention has a preassembled module that includes a support beam that is fastened to reinforced sheet metal structure of the door easily.

Still another feature of the invention is that the modular vehicle door of the invention has a preassembled module that includes a support beam that combines with a crash beam through reinforced sheet metal structure of the door to improve crashworthiness.

These and other objects, features and advantages of the invention will become more apparent from the following description of a preferred embodiment taken in conjunction with the accompanying drawing.

BRIEF DESCRIPTION OF THE DRAWINGS

The presently preferred embodiment of the invention is disclosed in the following description and in the accompanying drawings, wherein.

DETAILED DESCRIPTION OF THE PREFERRED EMBODIMENT

Figure 1:
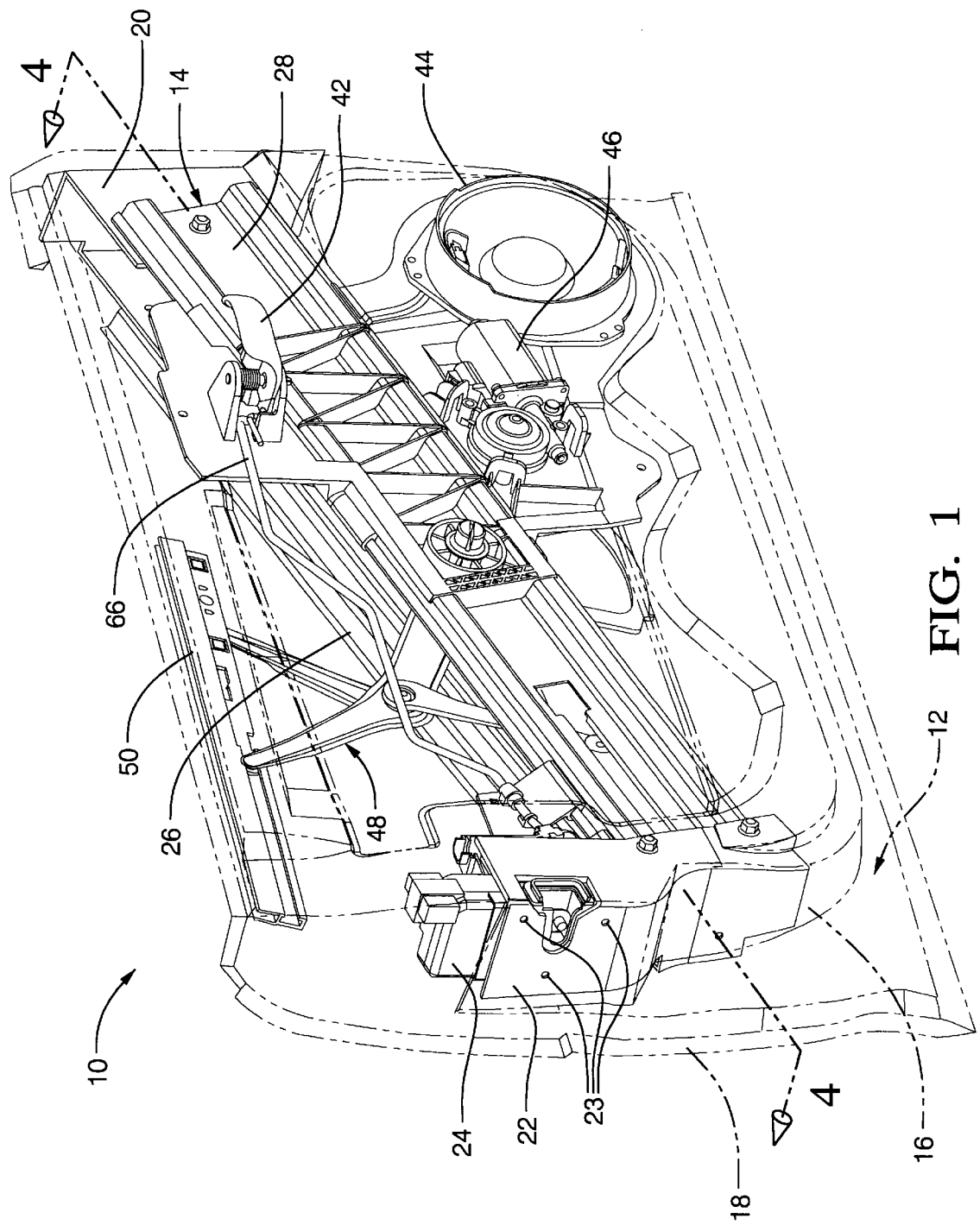
FIG. 1 is a perspective view of a front driver's side modular vehicle door of the invention taken from the interior side of the door.

Vehicle Door 10 is of modular construction comprising a hollow structural shell 12 and a module 14 that supports several working parts of vehicle door 10. Module 14 is preassembled and then assembled to the hollow structural shell 12 as a preassembled module.

Door shell 12 conventionally comprises an inner door panel 16 and an outer door panel 18 that are stamped sheet metal parts that are mated and secured together at their abutting peripheries by hemming and/or welding or in any suitable fashion to form a strong hollow structural unit that protects the passenger compartment as well as closing the door opening.

Door shell 12 also includes an upper hinge reinforcement 20 that is fastened to the sheet metal panels at the forward end to provide a strong support for one of the hinges (not shown) that is used to support vehicle door 10 on the A-pillar of the vehicle body (not shown). Door shell 12 further includes a latch reinforcement 22 that is fastened to the sheet metal panels at the aft end to provide a strong support for a latch assembly 24. Latch assembly 24 cooperates with a striker that is attached to the B-pillar of the vehicle body to latch vehicle door 10 in the closed position.

Door shell 12 also includes a crash beam 26 that is attached to upper hinge reinforcement 20 at one end and to latch reinforcement 22 at the other end so as to extend across the length of vehicle door 10. The function of crash beam 26 is to strengthen vehicle door 10 and provide passenger protection against side impacts to the vehicle at vehicle door 10. Crash beam 26 may be made of a metal such as steel or aluminum and can be made of roll form or tubular construction.

Figure 4:
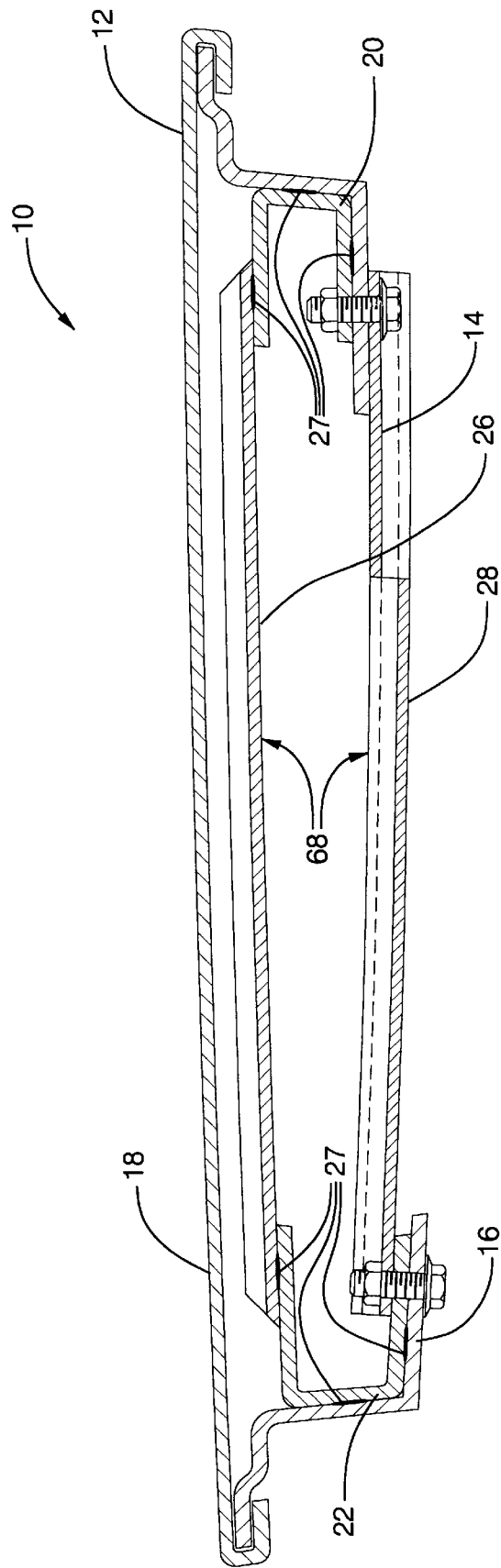
FIG. 4 is a schematic horizontal section of the modular vehicle door shown in FIG. 1 taken substantially along the line 4—4 of FIG. 1 and looking in the direction of the arrows.

Reinforcements 20 and 22 are usually welded to inner door panel 16 and crash beam 26 is usually welded to reinforcements 20 and 22 as indicated by spot welds 27 in FIG. 4. However, any suitable fastening can be used.

Module 14 comprises a support beam 28 that has a rolled section to provide upper and lower channels 30 and 32 and rolled ends 34 and 36 that provide torsional rigidity for support beam 28. Support beam 28 is made of metal, for example, steel or aluminum. When made of steel, support beam 28 has a thickness on the order of 1 to 2 millimeters. An aluminum support beam would have a greater thickness to provide the same strength.

Figure 2:
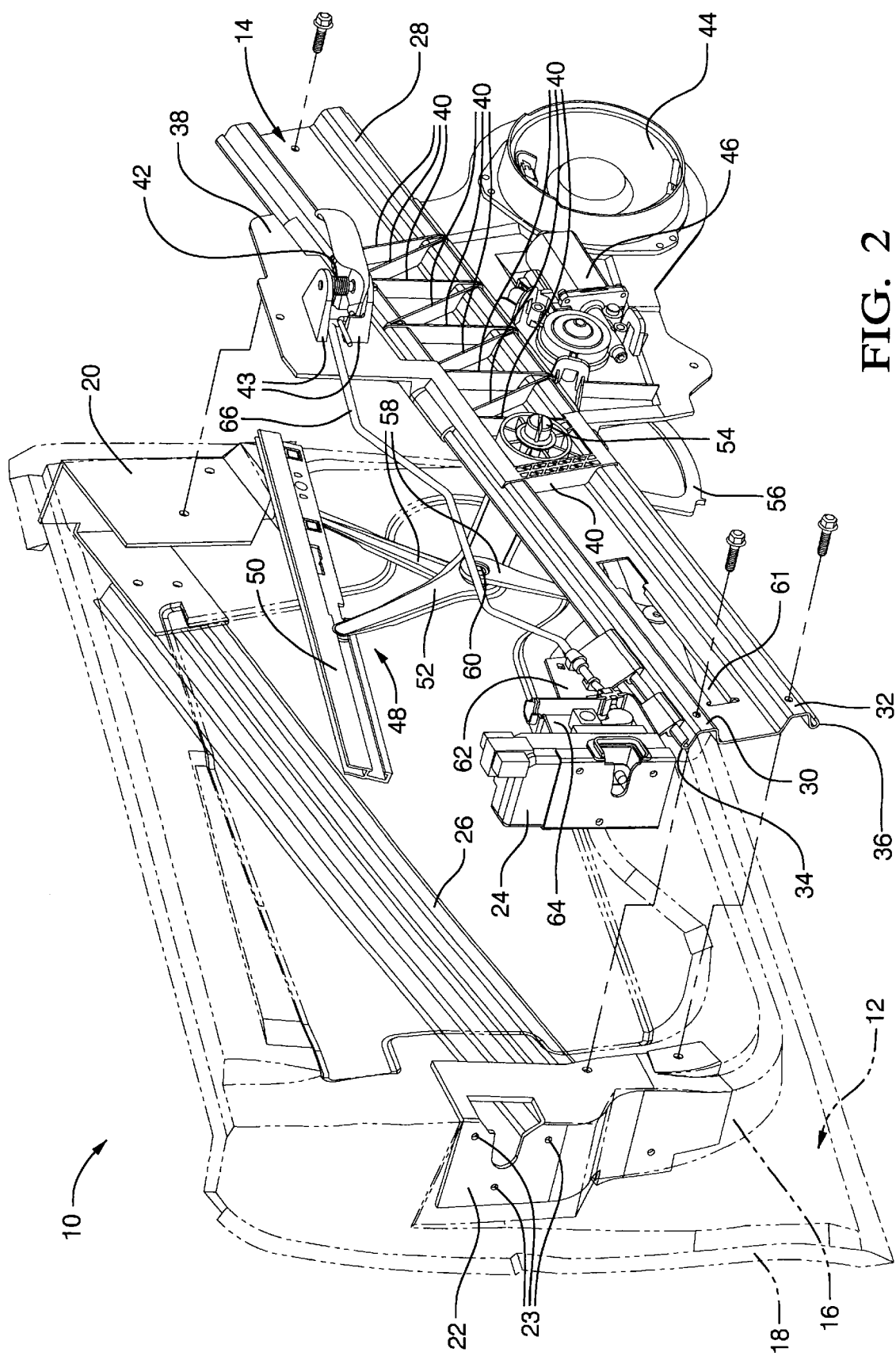
FIG. 2 is an exploded perspective inside view of the modular vehicle door shown in FIG. 1.
Figure 3:
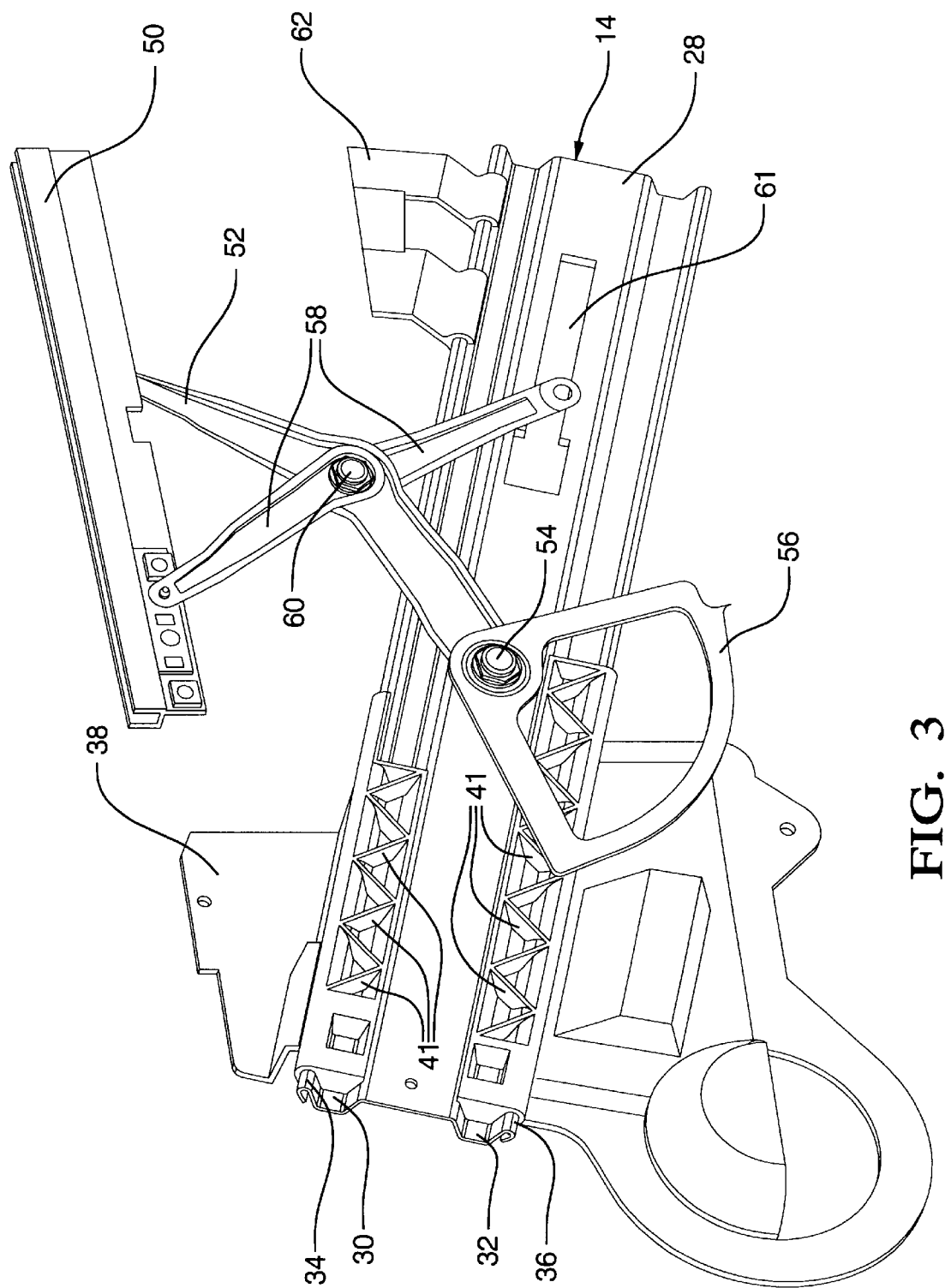
FIG. 3 is aperspective outside view of the module that is shown in FIG. 2.

Module 14 further comprises an insert molded carrier 38 that is molded molded plastic construction. Insert molded carrier 38 has a plurality of ribs 40 that extend between and cross-over channels 30 and 32 on the interior side as shown in FIGS. 1 and 2. Insert molded carrier 38 preferably also includes ribs 41 which span the hollow side of channels 30 and 32 on the interior side as shown in FIG. 3. Ribs 40 and 41 increase the torsional ridigity of support beam 28 greatly thereby increasing the strength of modular vehicle door 10 greatly when module 14 is attached to door shell 12.

Module 14 further comprises an inside handle 42 that pivots in integral spaced brackets 43 of carrier 38, a speaker 44 that is snap fit into a lower annular portion of carrier 38 and a window lift motor 46 that is mounted on carrier 38 just below support beam 28.

Module 14 also includes a regulator assembly that is driven by motor 46 such as a cross arm regulator assembly 48, for moving a glass panel (not shown) between a raised position and a stored position in modular vehicle door 10. Cross arm regulator assembly 48 comprises an upper sash channel 50 that is attached to the lower edge of a glass panel (not shown) and a lift arm 52 that is pivotally mounted on carrier 38 by a pivot stud 54. The upper end of lift arm 52 slides in sash channel 50 and the lower end of lift arm 52 has a sector gear 56 that is driven by lift motor 46. Regulator assembly 48 also includes a two piece balance arm 58 that is pivotally connected to lift arm 52 at 60 so that balance arm 58 pivots as a single arm with respect to lift arm 52. The upper end of balance arm 58 slides in sash channel 50 while the lower end of balance arm 58 slides in a cam slot 61 of support beam 28. Module 14 also preferably includes a counterbalance spring (not shown) that surrounds and engages in a slot of pivot stud 54 to assist lift motor 46 in raising sash channel 50 and the glass panel supported by it (not shown). Cross arm regulator assemblies are well know in the vehicle door art and consequently the operation of cross arm regulator assembly 48 need not be described in any further detail.

Module 14 further includes an insert molded bracket 62 and a latch retainer 64 that slides on bracket 62. Latch retainer 64 holds latch 24 in position for assembly into door shell 12 and fastening to latch reinforcement 22. Latch 24 is operatively connected to handle 42 by an inside handle rod 66. Module 14 may also include a wire harness (not shown) for transmitting electrical power to speaker 44, motor 46 and other electrical equipment such as a power door lock.

Module 14 is attached to door shell 12 so that support beam 28 is laterally spaced from crash beam 26 in a generally parallel fashion as best shown in FIG. 4. FIG. 4 is schematic in nature and only support beam 28 of module 14 is shown for clarity. For assembly, the door latch or aft end of module 14 is inserted into hollow door shell 12 and abutted against latch reinforcement 22. Support beam 28 is then bolted or otherwise suitably attached to latch reinforcement 22 at the aft end through inner door panel 16 as shown at the left in FIGS. 1 and 4. Support beam 28 is then abutted against inner door panel 16 and bolted or otherwise suitably attached to upper hinge reinforcement 20 at the other end through inner panel 16 so as to extend across the length of the door. Latch assembly 24 may then be secured to latch reinforcement 22 by bolts (not shown) that screw into the latch assembly through holes 23 in the face plate of latch reinforcement 22.

Upper hinge reinforcement 20 and latch reinforcement 22 are both U-shaped so that each has an inboard leg and an outboard leg as best shown in FIG. 4. Support beam 28 is attached to the inboard legs of the reinforcements while crash beam 26 is attached to the outboard legs of the two reinforcements thus forming a box section 68 that is below conventional inner and outer belt box sections (not shown) that are partially formed by inner and outer door panels 16 and 18 respectively. Box section 68 improves the crashworthiness of modular vehicle door 10 significantly.

In a frontal impact, any load that is to be supported by a vehicle door is typically maintained almost entirely by the inner and outer belt box sections of the door. However, in the modular vehicle door 10 of the invention, box section 68 formed by crash beam 26 and module 14 also resists frontal impact loads and consequently the modular vehicle door 10 of the invention increases the load carrying capacity of the vehicle door in frontal impacts.

In a side impact, any load that is to be supported by a vehicle door is typically maintained almost entirely by the crash beam. However, in the modular vehicle door 10 of the invention, crash beam 26 and support beam 28 of module 14 create a compound beam with a much larger cross section that enables modular vehicle door 10 to handle a significantly larger portion of side impact loads. The increased capacity to handle side impact loads can be further enhanced by constructing reinforcements 20 and 22 and attaching beams 26 and 28 to the reinforcements 20 and 22 so that the reinforcements 20 and 22 twist inwardly toward each other as crash beam 26 bends inwardly and stretch support beam 28 in tension until crash beam 26 bottoms out on support beam 28. Both beams then bend inwardly.

Consequently, the modular construction of the modular vehicle door of the invention not only facilitates construction of modular vehicle door 10 but also provides a stronger vehicle door with improved crashworthiness in frontal and side impacts.

Obviously many modifications and variations of the present invention in light of the above teachings may be made. It is, therefore, to be understood that, within the scope of the appended claims, the invention may be practiced otherwise than as specifically described.

We claim:

1. A modular vehicle door having a hollow door shell of sheet metal panels that are secured together at their abutting periphery, a crash beam that is attached to the hollow closure so as to extend diagonally across the length of the door, and a module that supports several parts of the vehicle door that is preassembled and assembled to the hollow closure as the preassembled module, characterized in that:

the hollow door shell has a first reinforcement at a forward end and a second reinforcement at an aft end, the module has a metal support beam that is attached to the first reinforcement at one end and to the second reinforcement at the other end so that the metal support beam extends diagonally across the length of the door and forms a box section with the crash beam, the first reinforcement and the second reinforcement both being U-shaped so that each has an inboard leg and an outboard leg, the metal support beam being attached to the inboard legs of the reinforcements while crash beam is attached to the outboard legs of the reinforcements to form the box section, and the metal support beam being attached against an inner surface of the inboard leg of the reinforcement at one end and to an outer surface of the inboard leg of the reinforcement at the other end.

2. The modular vehicle door as defined in claim 1 wherein the metal support beam has a rolled section to provide upper and lower channels and rolled ends that increase torsional rigidity of the support beam.

3. The modular vehicle door as defined in claim 2 wherein the module includes an insert molded carrier that has a plurality of ribs that extend between and cross over the channels of the support beam to increase the torsional ridigity of the support beam.

4. The modular vehicle door as defined in claim 1 wherein the metal support beam has a rolled section to provide upper and lower channels and rolled ends that increase torsional rigidity of the support beam, the module includes an insert molded carrier that has a plurality of ribs that extend between and cross over the channels of the support beam to increase the torsional ridigity of the support beam, and the insert molded carrier has a plurality of ribs that span a hollow side of the channels.

5. The modular vehicle door as defined in claim 4 wherein the module further includes an inside handle that is rotationally mounted on the carrier, a door latch that is slideably carried on the support beam and an operating rod connected to the inside handle and the door latch.

6. The modular vehicle door as defined in claim 4 wherein the module further includes a speaker that is supported by the carrier, a lift motor that is supported by the carrier, and a regulator assembly that is operated by the lift motor for moving a glass panel between a raised position and a stored position in the modular vehicle door.

7. A modular vehicle door comprising:

a hollow door shell of sheet metal panels that are secured together at their abutting periphery, a crash beam that is attached to a hinge reinforcement at a forward end of the hollow closure and to a door latch reinforcement at an aft end of the hollow closure that is substantially lower than the hinge reinforcement so that the crash beam extends diagonally across the length of the door, and a module that supports several parts of the vehicle door that is preassembled and assembled to the hollow closure as the preassembled module, and the module having a metal support beam that is attached to the hinge reinforcement at one end and to the door latch reinforcement at the other end so that the metal support beam extends diagonally across the length of the door and forms a box section with the crash beam.

8. The modular vehicle door as defined in claim 7 wherein the first reinforcement and the second reinforcement are both U-shaped so that each has an inboard leg and an outboard leg, and wherein the metal support beam is attached to the inboard legs of the reinforcements while crash beam is attached to the outboard legs of the reinforcements to form the box section.

9. A modular vehicle door having a hollow door shell of sheet metal panels that are secured together at their abutting periphery, a crash beam that is attached to the hollow closure so as to extend across the length of the door, and a module that supports several parts of the vehicle door that is preassembled and assembled to the hollow closure as the preassembled module, characterized in that:

the hollow door shell has a first reinforcement at a forward end and a second reinforcement at an aft end, the module has a metal support beam that is attached to the first reinforcement at one end and to the second reinforcement at the other end so that the metal support beam extends across the length of the door and forms a box section with the crash beam, the first reinforcement and the second reinforcement both being U-shaped so that each has an inboard leg and an outboard leg, and the metal support beam being attached to the inboard legs of the reinforcements while crash beam is attached to the outboard legs of the reinforcements to form the box section, the first reinforcement being an upper hinge reinforcement and the second reinforcement being a latch reinforcement and the metal support beam of the module being bolted to the inboard legs of the reinforcements through an inner sheet metal panel of the hollow door shell.

10. The modular vehicle door as defined in claim 9 wherein the metal support beam has upper and lower channels and the module includes an insert molded carrier that has a plurality of ribs that cooperate with the channels of the metal support beam to increase the torsional ridigity of the metal support beam.

* * * * *